United States Patent Office 3,436,365
Patented Apr. 1, 1969

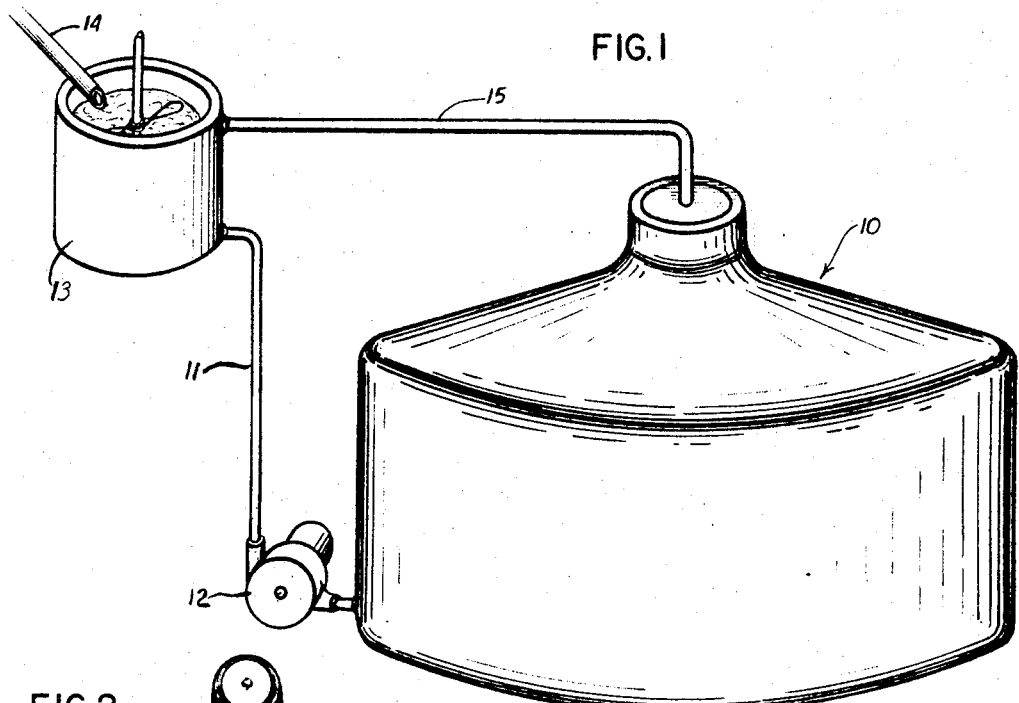
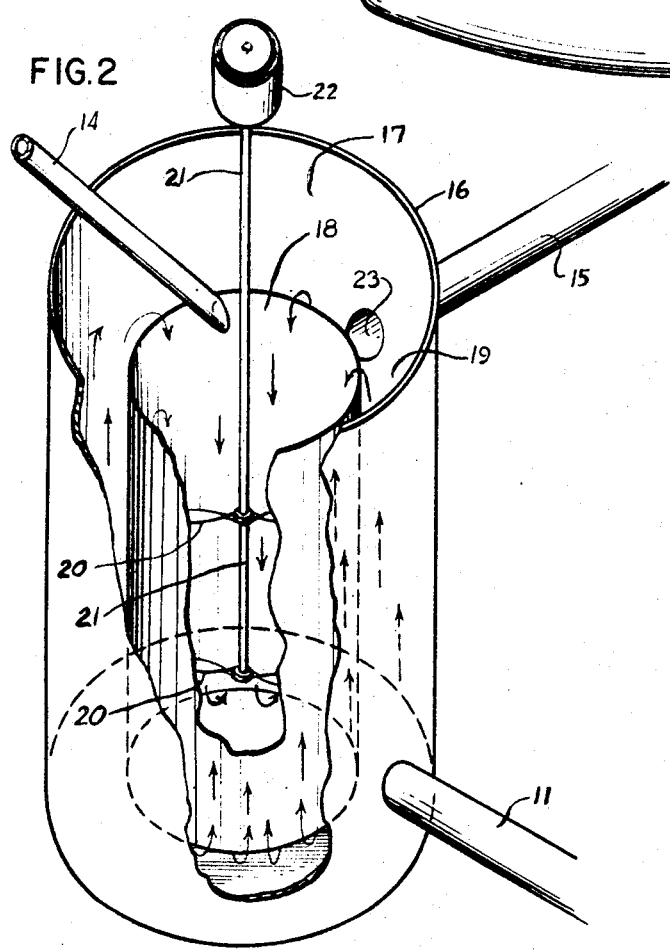

3,436,365
METHOD FOR FORMING SOLUTIONS OF POLYESTER RESIN IN LIQUID POLYMERIZABLE ETHYLENICALLY UNSATURATED MONOMERS
Arthur Weber, Wyckoff, and Francis R. Hill, Florham Park, N.J., and David Rowe, South Gate, Calif., assignors to Interchemical Corporation, New York, N.Y., a corporation of Ohio
Filed Oct. 20, 1965, Ser. No. 498,586
Int. Cl. B01f 3/10; C08g 21/02
U.S. Cl. 260—33.6                                    9 Claims

ABSTRACT OF THE DISCLOSURE

A process for dissolving polyester resin in styrene or similar liquid monomer by feeding molten polyester into a relatively hot mixing zone containing styrene or other similar liquid monomer, continuously removing some of the blend from the mixing zone to a storage and cooling tank containing styrene or other liquid monomer, and continuously replenishing the monomer in the mixing zone by feeding back the relatively lean mixture of polyester in monomer from the storage tank until the polyester/monomer ratio in the storage tank is at the desired figure.

---

This invention relates to a novel method for dissolving polyester resins in liquid polymerizable ethylenically unsaturated monomers having an initial boiling point above 60° C. such as monomeric styrene.

Solutions of polyester resins and liquid polymerizable ethylenically unsaturated monomers are used quite extensively as curable compositions for many uses including castings and coating. Styrene monomers are among the most commonly used of these liquid monomers. However, the monomeric materials may be any one of a number of compounds containing a polymerizable $CH_2=C<$ group and desirably having a boiling point above about 60° C. Among the many suitable terminally unsaturated monomers that may be employed are the following: styrene, and alkyl and halo substituted styrene such as alpha methylstyrene, alpha chlorostyrene, alpha ethylstyrene and the like or alkyl and halo ring-substituted styrenes such as ortho-, meta- and para-alkyl styrenes, e.g., o-methylstyrene, p-ethylstyrene, m-propylstyrene, 2,4-dimethylstyrene, 2,5-diethylstyrene,o-bromostyrene, p-chlorostyrene, o-chlorostyrene, 2,4-dichlorostyrene, vinyl toluene, divinyl benzene and the like. (When the term styrene is used in this specification, it is meant to cover the substituted styrenes as well.) Lower alkyl esters of acrylic and methacrylic acids such as methyl methacrylate, butyl methacrylate, ethyl ethacrylate, methyl acrylate and butyl acrylate may also be used as monomeric material. Additionally, aliphatic vinyl esters may be suitably employed such as vinyl stearate, vinyl laurate, vinyl butyrate and vinyl acetate.

Usually the polyester resins are dissolved in the liquid monomers. These solutions or mixtures are very unstable on storage, and it is conventional to incorporate a standard gelation inhibitor such as p-tert-butyl catechol, hydroquinone and quinone into the solution to prevent gelation on storage. When inhibited in such a manner, the solutions may be stored for a period in excess of six months substantially without gelation. When the solutions are to be cured, free-radical initiators are added, and the solutions may be readily cured by heat.

One problem which has hampered the art in the past has been how to mix the polyester resin and the liquid monomers without degrading or destroying the inhibitor which is essential for subsequent storage stability. In order to dissolve the polyester resin in the styrene or any of the other liquid monomers, the polyester resin must for all practical purposes be maintained in the molten state during the mixing of the resin and the styrene. The polyester resins, particularly those having high melting points result in high temperatures during the solution of the polyester resins in the liquid monomers; the resulting high temperatures tend to degrade and destroy the inhibitor. Without sufficient inhibitor present particularly at the high temperatures, extensive copolymerization between the liquid monomers and polyester resins takes place immediately, and the mixture is rendered virtually useless.

We have now discovered a novel method of dissolving polyester resins in styrene monomers or other liquid monomers substantially with negligible degradation or destruction of the inhibitor and with negligible attendant gelation. Our method comprises continuously feeding the liquid monomer containing the inhibitor maintained at a temperature below 150° F. to a mixing zone, continuously feeding said polyester resin in the molten state at a temperature of 300° to 350° F. to said mixing zone, continuously removing the resulting solution of polyester resin in liquid monomer from said mixing zone, continuously feeding said solution to a storage zone containing liquid monomer with gelation inhibitor to provide a more dilute solution of the polyester resin in liquid monomers and continuously removing the solution from the storage zone to provide the liquid monomer feed to the mixing zone, the maximum capacity of the mixing zone in volume being 5% of the total volume of the solution of polyester resin in liquid monomer to be produced, the rate feed of the styrene and polyester resin into the mixing zone and the rate of removal of the solution from the mixing zone being controlled so that the temperature of the mixing zone is between 200 and 210° F. and the residence time in the mixing zone is a maximum of 2 minutes, and the storage zone being maintained at a temperature below 150° F.

The operation of our method is based in part upon our finding that the inhibitors may be exposed to heat of 200 to 210° F. and in some cases 200 to 240° F. for short periods of time, 2 minutes or less without any significant deterioration or loss of gelation inhibitor. Therefore if the mixing zone is maintained at this temperature range and the residence time in the mixing zone is 2 minutes or below, substantially no inhibitor deterioration will take place. When not in the mixing zone, the mixture containing inhibitor should be maintained at a temperature below 150° F. Since the solution in the storage zone containing inhibitor is continuously recirculated through the mixing zone, the higher temperature in the mixing zone while having substantially no effect on the inhibitor on each pass due to the short residence time, appears to have a cumulative effect. In order to insure against such a cumulative effect, it has been found that the maximum capacity of the mixing zone should be 5% of the total volume of the solution of the polyester resin in liquid monomer. This limitation insures that the inhibitor will spend the great majority of time required for the formation of the solution outside of the mixing zone and at a temperature below 150° C. The method may be still operated where the maximum capacity of the mixing zone is 10% of the total volume but under such conditions there appears to be some loss of inhibitor. However, the inhibitor loss should not be sufficient to degrade the curing properties and shelf life of the material.

The method of this invention is applicable to the solution of polyester resins in styrene or any of the other previously listed liquid monomers which have boiling points above about 60° C. Among the most extensively used of the liquid monomers to which our method may be applied are styrene, vinyl toluene, alpha-chlorostyrene, methyl methacrylate and butyl methacrylate.

The polyester resins are the reaction products of polyhydric alcohols and polycarboxylic acids which may be used in the form of their anhydrides. For example, one type of polyester resin is produced by reacting an $\alpha,\beta$-ethylenically unsaturated dicarboxylic acid, e.g. maleic acid with a glycol such as propylene glycol or dipropylene glycol. The reaction is usually carried out at an elevated temperature and preferably in the presence of an inert atmosphere which is usually produced by passing carbon dioxide, nitrogen or other inert gases through the mixture. The polyester resins may be further modified by replacing a portion of the unsaturated dicarboxylic acid with a phthalic acid.

The polyhydric alcohols used in making the polyester resins include ethylene glycol, propylene glycol, butylene glycol, diethylene glycol and dipropylene glycol as well as neopentyl glycol and Bisphenol A (2,2-bis (hydroxyphenyl) propane) and propoxy or ethoxy ethers of Bisphenol A, triethylene glycol, tripropylene glycol, 1,3-butanediol, 1,6-hexamethylene glycol and trimethyl propanediol. Other polyols which may be used include glycerine, pentaerythritol, trimethylol ethane and trimethylol propane.

The $\alpha,\beta$-ethylenically unsaturated dicarboxylic acids are preferably maleic anhydride and fumaric acid. Also the dicarboxylic acid may be halogenated. The phthalic acid component may be isophthalic acid, terephthalic acid, phthalic anhydride, tetrachlorophthalic anhydride, hexachlorophthalic anhydride, tetrabromophthalic anhydride and tetrahydrophthalic anhydride.

It should be noted that unless otherwise indicated all proportions in this specification and claims are by weight.

In the drawings:

FIG. 1 is a schematic diagram of the apparatus used in the method of this invention.

FIG. 2 is a perspective view of the mixing apparatus with sections broken away.

With reference to FIG. 1, the liquid polymerizable monomers which for convenience will be considered to be styrene are stored in storage tank 10. The gelation inhibitor is mixed with this styrene. This tank is maintained at below 150° F. In order to maintain this temperature as the operation continues, the tank may be cooled by circulating water through a cooling jacket (not shown) around the walls of the tank. Initially or under "start-up" conditions, the tank is at room temperature or below. The styrene containing inhibitor is continuously removed from the tank via conduit 11 and pumped by pump 12 into mixer 13, into which the molten polyester resin at a temperature of 300–350° F. is fed via feed-line 14. The capacity of storage tank 10 exceeds the total volume of the solution of polyester resin in styrene to be produced while the maximum capacity of mixer 13 is 5% of the total volume of the solution. The rates of flow through conduit 11 and feed-line 14 are controlled so that the temperature of the mixer 13 remains preferably within the range 200–210° F. Temperatures up to 240° F. may be used. The solution formed in the mixer is continuously withdrawn through conduit 15 and fed into the storage tank in which it mixes with tank composition which has a higher styrene content. Thus, once the "start-up" conditions are completed and the method is operating under regular continuous conditions, the polyester resin content of storage tank 10 is continuously increasing and the temperature of the tank tends to rise continuously as the hotter mixture from mixer 11 is fed to the tank. In order to maintain the tank below 150° F., the cooling rate of the tank may be increased by increasing the cooling action of the cooling jacket. Also the solution taken from mixer 13 via conduit 15 may be cooled to the temperature of tank 10 by independent cooling means such as a cooling jacket around conduit 15 prior to being fed into the tank.

The temperature of storage tank 10 may also be reduced by reducing the temperature of mixer within the previously described range by either increasing the feed via conduit 11 or decreasing the polyester resin feed via line 14. However, care must be taken that the temperature of the mixer is not reduced to a point that the molten polyester-resin being fed to the mixer begins to solidify upon contact wtih the solution in the mixer. Also, the storage tank temperature may be reduced by slowing down the combined feed to mixer 13. In addition, care should be taken that the residence time in the mixer is not increased beyond about 2 minutes.

It should be noted that mixer 13 preferably is always full to the point that an amount of solution equal to the combined components fed via conduits 11 and line 14 exits via conduit 15.

In order to achieve sufficiently complete mixing of the polyester resin and the styrene or other liquid monomer solution fed to the mixer in the relatively short residence time in the mixer and in order to provide for uniform heat distribution in the mixer, we have invented a novel mixer which is shown in detail in FIG. 2. Outer cylindrical housing 16 encloses chamber 17. Inner cylinder 18 open at both ends and sharing a common axis with housing 16 is mounted within chamber 17 and encloses an inner chamber 19. The axis of cylinder 18 is shorter than that of housing 16 and chamber 17 communicates with inner chamber 19 via the open ends of cylinder 18. Screw propellers 20 are mounted on rotatable axial shaft 21 in inner chamber 18. Motor 22 rotates shaft 21. Feed-line 14 feeds the polyester resin into inner chamber 19. Conduit 11 feeds the styrene solution containing the inhibitor into outer chamber 17 and the mixture flows out of the mixer through opening 23 into conduit 15. Shaft 21 rotates so that the liquid current within inner chamber 19 will be down and the liquid current in outer chamber 19 will be up. In the mixer the inner chamber into which the polyester resin is fed will tend to be warmer than the outer chamber. Therefore, the polyester resin is fed into the warmest area of the mixer and the possibility of molten polyester coming into contact with colder entering styrene liquid and solidifying is substantially reduced. Also, every polyester resin molecule must at least travel down the inner chamber and up the outer chamber before being removed through opening 23. In addition, the point of entrance of conduit 11 and the point of exit of conduit 15 are separated by about 120° F. when projected upon the base of the outer cylindrical housing. Thus, the minimum distance that an entering styrene solution component through conduit 11 must travel before exiting through opening 23 is increased. The arrows indicate the circulation within the mixer.

The following examples will further illustrate the practice of this invention:

EXAMPLE 1

Using the apparatus and the method described, 70 parts by weight of a polyester resin made from 5.75 moles of fumaric acid, 4.25 moles of isophthalic acid, 2.3 moles of ethylene glycol and 8.3 moles diethylene glycol are dissolved in 30 parts of liquid styrene containing 350 parts per million of p-tert-butyl catechol. The storage tank has a capacity of more than the volume of the 100 parts combined. The capacity of the mixer is the volume of about 1 part of the solution. The residence time in the mixer is about 60 seconds. The molten polyester resin has a temperature of about 320° F., the storage tank is maintained below 150° F. and the mixer is maintained at a temperature of 200° to 220° F. The resulting solution of polyester resin in styrene displays no gelation and may be cured readily in the conventional manner by the application of heat and the addition of free-radical initiators.

This procedure may be repeated using either vinyl toluene or methyl methacrylate in place of the styrene.

EXAMPLE 2

The procedure of Example 1 is repeated using the same conditions and proportions except that the polyester resin is made from 5.0 moles of maleic anhydride, 5.0 moles of phthalic anhydride and 11 moles of propylene-glycol, and the molten polyester resin is added at a temperature of 320° F. and the mixer is maintained at a temperature of 200–210° F. The resulting solution of polyester resin in styrene displays no gelation and may be cured readily in the conventional manner by the application of heat and the addition of free-radical initiators.

In the method of this invention polyester resin, liquid monomer and inhibitor are mixed in conventional proportions e.g., in the order of from 1 to 3 parts of polyester resin for each part of liquid monomer and from 80 to 200 parts of inhibitor per million parts of alkyd resin.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A method of dissolving a polyester resin comprising polyhydric alcohol and unsaturated dicarboxylic acid units in a liquid polymerizable, ethylenically unsaturated monomer having an initial boiling point above 60° C. containing gelation inhibitor which comprises continuously feeding the liquid monomer maintained at a temperature below 150° F. to a mixing zone, continuously feeding said polyester resin in the molten state at a temperature of 300° to 350° F. to said mixing zone, continuously removing the resulting solution of polyester resin in liquid monomer from said mixing zone, continuously feeding said solution to a storage zone containing liquid monomer with gelation inhibitor to provide a more dilute solution of the polyester resin in liquid monomers and continuously removing the solution from the storage zone to provide the liquid monomer feed to the mixing zone, the maximum capacity of the mixing zone in volume being 5% of the total volume of the solution of polyester resin in liquid monomer to be produced, the rate feed of the styrene and polyester resin into the mixing zone and the rate of removal of the solution from the mixing zone being controlled so that the temperature of the mixing zone is between 200 and 240° F. and the residence time in the mixing zone is a maximum of 2 minutes, and the storage zone being maintained at a temperature below 150° F.

2. The method of claim 1 wherein the solution of polyester resin in styrene removed from the mixing zone is continuously cooled prior to being fed to the storage zone.

3. The method of claim 1 wherein said liquid monomer is styrene.

4. The method of claim 1 wherein said liquid monomer is a lower alkyl ester of an acid selected from the group consisting of acrylic and methacrylic acid.

5. The method of claim 1 wherein said polyester resin further includes phthalic acid units.

6. The method of claim 4 wherein said phthalic acid is isophthalic acid.

7. The method of claim 1 wherein said dicarboxylic acid is fumaric acid.

8. The method of claim 1 wherein said dicarboxylic acid is maleic acid.

9. The method of claim 1 wherein said polyhydric alcohol is a glycol.

References Cited

UNITED STATES PATENTS

| | | | |
|---|---|---|---|
| 3,275,710 | 9/1966 | Wooster et al. | 260—861 |
| 3,251,798 | 5/1966 | Pollien | 260—34.2 |
| 2,649,382 | 8/1953 | Vesce. | |

MORRIS LIEBMAN, *Primary Examiner.*

R. BARON, *Assistant Examiner.*

U.S. Cl. X.R.

260—34.2, 861